(12) United States Patent
Beller et al.

(10) Patent No.: US 10,217,031 B2
(45) Date of Patent: *Feb. 26, 2019

(54) IDENTIFYING COMPLIMENTARY PHYSICAL COMPONENTS TO KNOWN PHYSICAL COMPONENTS

(71) Applicant: International Business Machines Corporation, Armonk, NY (US)

(72) Inventors: Charles E. Beller, Baltimore, MD (US); Benjamin L. Johnson, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/292,320

(22) Filed: Oct. 13, 2016

(65) Prior Publication Data

US 2018/0107895 A1 Apr. 19, 2018

(51) Int. Cl.
| | | |
|---|---|---|
| *H04N 5/232* | (2006.01) |
| *G06K 9/62* | (2006.01) |
| *G06T 7/00* | (2017.01) |
| *G06T 7/60* | (2017.01) |
| *G06Q 30/06* | (2012.01) |
| *G06F 17/30* | (2006.01) |

(52) U.S. Cl.
CPC ....... *G06K 9/628* (2013.01); *G06F 17/30247* (2013.01); *G06K 9/6204* (2013.01); *G06Q 30/0625* (2013.01); *G06Q 30/0635* (2013.01); *G06T 7/0085* (2013.01); *G06T 7/602* (2013.01); *H04N 5/23293* (2013.01); *G06K 2209/27* (2013.01)

(58) Field of Classification Search
CPC .......... G06F 17/30864; G06K 2209/27; G06K 9/6204; G06K 9/628; G06Q 30/0625; G06Q 30/0635; G06T 7/0085; G06T 7/602; H04N 5/23293
USPC ...................................................... 348/135
See application file for complete search history.

(56) References Cited

U.S. PATENT DOCUMENTS

| | | | |
|---|---|---|---|
| 6,025,850 A | 2/2000 | Gupta | |
| 7,609,289 B2 * | 10/2009 | Rastegar | H04N 5/2259 348/36 |
| 7,660,468 B2 * | 2/2010 | Gokturk | G06F 17/3025 382/209 |
| 7,761,182 B2 | 7/2010 | Gallarda et al. | |
| 8,755,837 B2 * | 6/2014 | Rhoads | G06F 17/30244 455/556.1 |
| 8,761,519 B2 | 6/2014 | Chang et al. | |
| 10,002,337 B2 * | 6/2018 | Siddique | G06Q 10/0637 |

(Continued)

OTHER PUBLICATIONS

Kanagaraj et al, Pseudo Eye: The next generation shopping application using augmented reality (Year: 2013).*

(Continued)

*Primary Examiner* — Shan E Elahi
(74) *Attorney, Agent, or Firm* — VanLeeuwen & VanLeeuwen; Diana R. Garhardt (57) ABSTRACT

An approach is provided that captures a digital image of an object that has a number of facets. The approach further determines the actual sizes of various facets found on the object. The actual sizes of the facets are used to identify compatible objects based, with the compatible objects being objects that can work with the object.

17 Claims, 10 Drawing Sheets

(56) References Cited

U.S. PATENT DOCUMENTS

| | | | |
|---|---|---|---|
| 2003/0059125 A1 | 3/2003 | Elzer | |
| 2008/0152231 A1* | 6/2008 | Gokturk | G06F 17/30256 382/209 |
| 2008/0212899 A1* | 9/2008 | Gokturk | G06F 17/30259 382/305 |
| 2008/0317379 A1* | 12/2008 | Steinberg | G06K 9/00248 382/275 |
| 2009/0189888 A1* | 7/2009 | Dollner | G06T 17/05 345/419 |
| 2009/0318228 A1* | 12/2009 | Hughes | G06F 3/04815 463/36 |
| 2010/0030578 A1* | 2/2010 | Siddique | G06Q 10/0637 705/3 |
| 2010/0067786 A1* | 3/2010 | Wilensky | G06K 9/342 382/165 |
| 2010/0166339 A1* | 7/2010 | Gokturk | G06F 17/30256 382/305 |
| 2010/0319176 A1 | 12/2010 | Stewart et al. | |
| 2013/0066750 A1* | 3/2013 | Siddique | G06Q 10/0637 705/27.2 |
| 2013/0215116 A1* | 8/2013 | Siddique | G06Q 30/0643 345/420 |
| 2014/0058938 A1* | 2/2014 | McClung, III | G06Q 20/227 705/41 |
| 2014/0214473 A1 | 7/2014 | Gentile et al. | |
| 2015/0186552 A1 | 7/2015 | Acharya et al. | |
| 2015/0325047 A1 | 11/2015 | Conner et al. | |
| 2016/0037071 A1* | 2/2016 | Emmett | H04N 5/23245 348/220.1 |
| 2016/0342626 A1* | 11/2016 | Li | G06F 17/30274 |
| 2018/0096473 A1* | 4/2018 | Kompalli | G06T 7/0002 |

OTHER PUBLICATIONS

Anonymous, "Three dimensional Visual Repair and Search of Damaged Machine Parts," ip.com Prior Art Database Technical Disclosure, IPCOM000216410D, Apr. 4, 2012, 3 pages.

"EasyMeasure—Measure with your Camera!" Caramba App, Apr. 2016, 2 pages.

"Point & Measure," TapTapSoft, 2011, 3 pages.

Beller et al., "Identifying Physical Tools to Manipulate Physical Components," U.S. Appl. No. 15/292,305, filed Oct. 13, 2016, 40 pages.

"List of IBM Patents or Patent Applications Treated as Related," Letter from Leslie A. Van Leeuwen, Oct. 13, 2016, 1 page.

* cited by examiner

IDENTIFYING COMPLIMENTARY PHYSICAL COMPONENTS TO KNOWN PHYSICAL COMPONENTS

BACKGROUND OF THE INVENTION

Technical Field

This disclosure relates to identifying complimentary physical components, such as home improvement hardware, based on digital images of known physical components.

Description of Related Art

Home improvement projects are often performed by amateurs that lack the necessary tools for the job. In many cases, these amateurs also lack the knowledge to identify which tools would be appropriate to purchase. Non-expert home repair projects can go over budget or get behind schedule due to accidental purchase of incorrect or incompatible tools. One source of error stems from difficulties of non-experts to distinguish fine variations in sizes between many similar tools (e.g. screwdrivers, wrenches, etc.). It would be useful for to use a mobile device to assist in this endeavor, however existing mobile technologies for measuring items are not sufficiently precise at the small scale of hand tools and fasteners. Moreover, traditional systems fail to identify tools or compatible hardware useful to work with hardware found by amateur "do it yourselfers" when addressing home project needs and requirements.

SUMMARY

An approach is provided that captures a digital image of an object that has a number of facets. The approach further determines the actual sizes of various facets found on the object. The actual sizes of the facets are used to identify compatible objects based, with the compatible objects being objects that can work with the object.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-10 show an approach for identifying necessary tools and components using a mobile device. In one embodiment, the approach includes first taking a digital photograph or image the physical object that is of interest to the user, such as by using a digital camera included in a smart phone. Next, the approach identifies the boundaries of the physical object to be measured. The approach can also determine whether there is a reference object included in the digital image for sizing purposes. The approach determines the physical size, or measurements, of the physical object utilizing the reference object data if provided. The approach next determines whether the object belongs to a fixed set of classes, such as a screw, bolt, nut, etc. Based on the data gathered, the approach identifies one or more appropriate replacement objects, such as those that might be available from an online merchant. The approach can also identify compatible tools from the online merchant, such as a particular wrench or tool used to manipulate or engage the physical object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
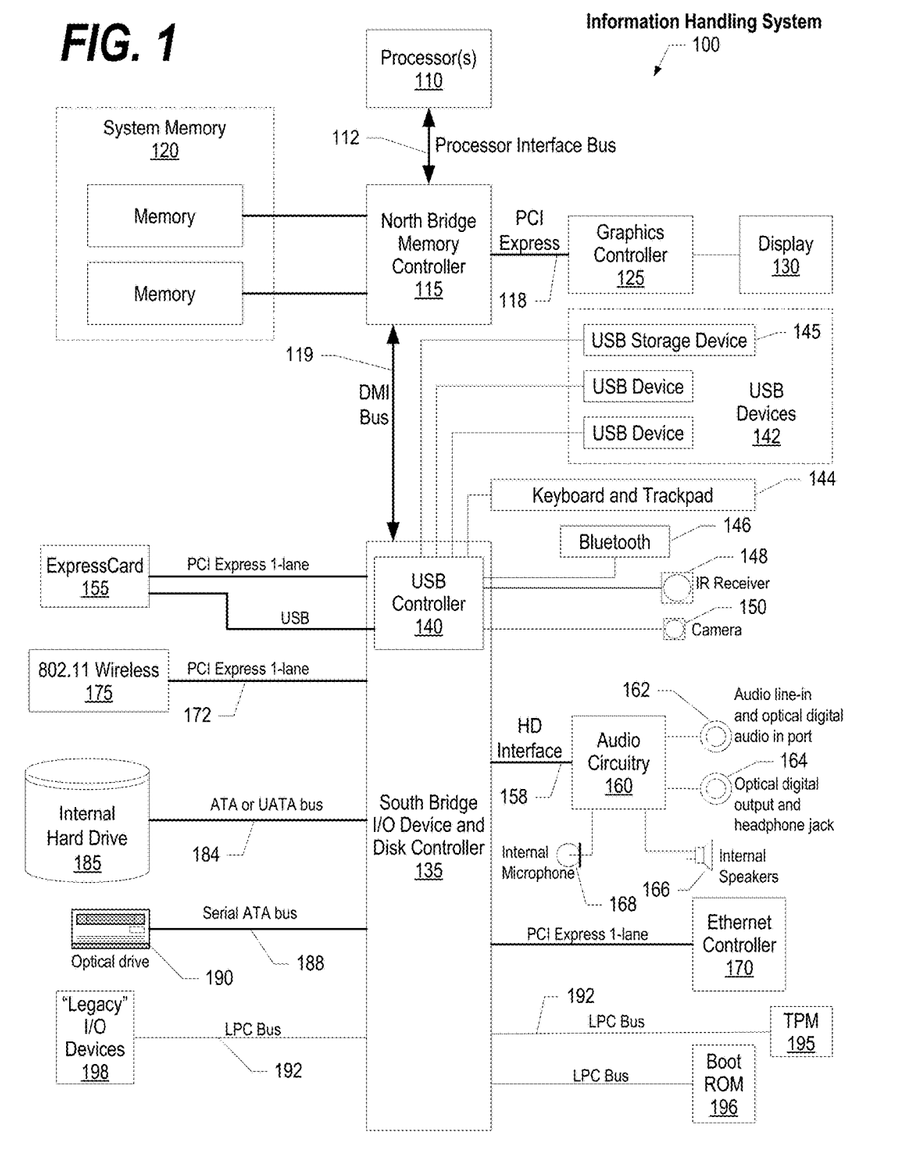
FIG. 1 depicts a block diagram of a processor and components of an information handling system.
Figure 2:
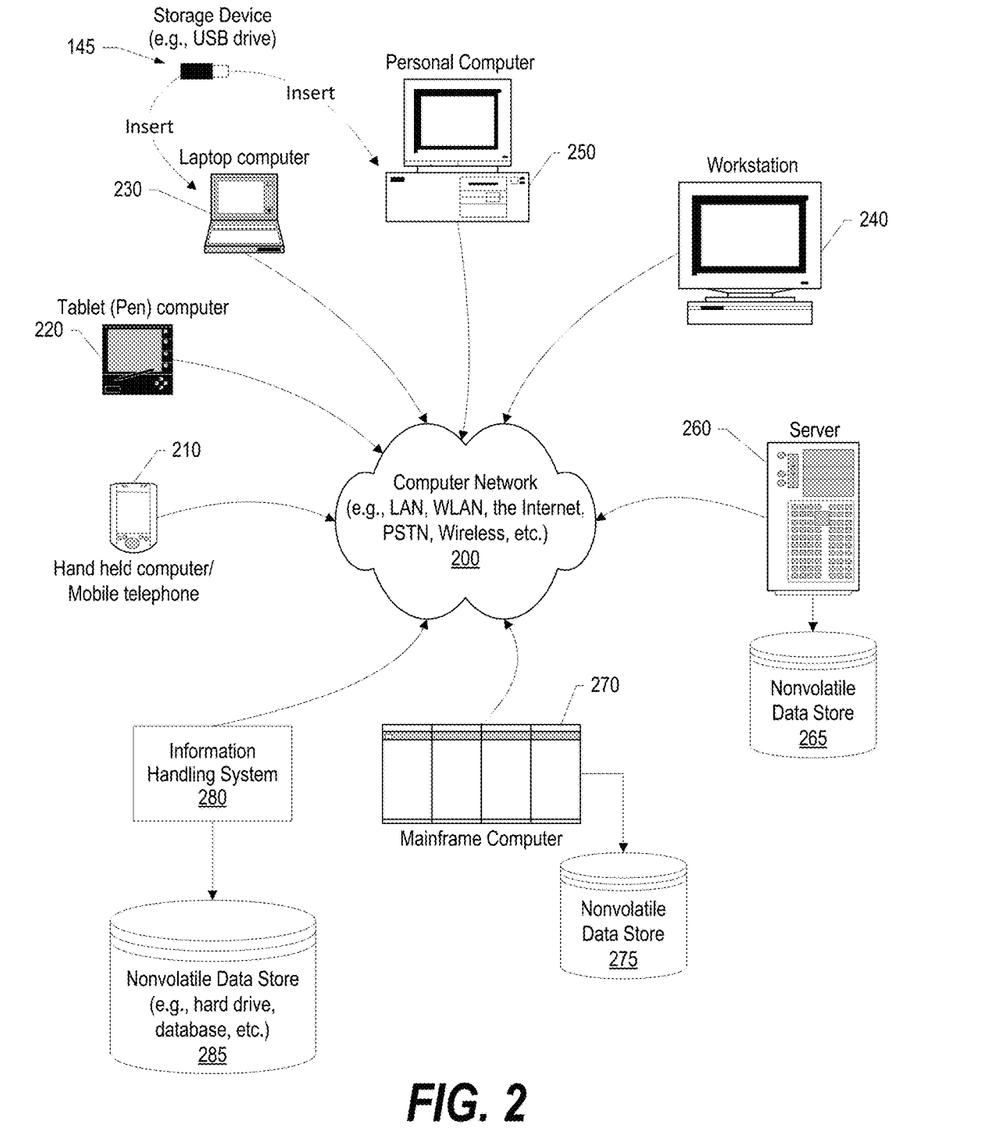
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
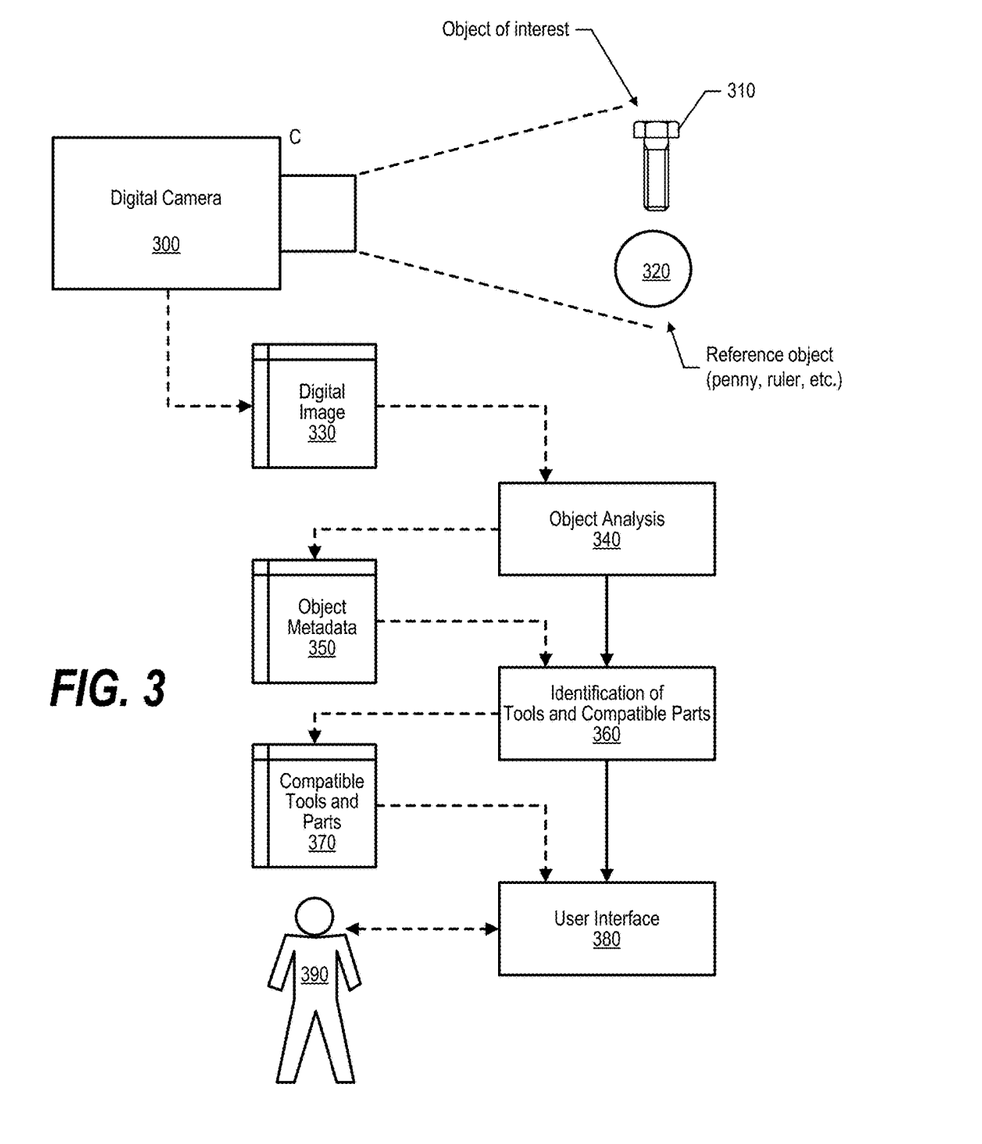
FIG. 3 is a diagram depicting a digital camera capturing images of a physical object and various processes acting on the object.

FIG. 3 is a diagram depicting a digital camera capturing images of a physical object and various processes acting on the object. Digital camera 300 is any camera that can record and store digital images. Digital camera 300 may be integrated into another device, such as a smart phone. Digital camera 300 captures a digital image of object 310, such as a hardware object like a bolt, nut, screw, fastener, or the like. Object 310 has any number of facets, such as the facets found on the head of a bolt, the facets found on a nut, screw, or other type of fastener or other hardware object. In addition, digital camera 300 may also capture the image of reference object 320. Reference object 320 is an object with a known size and shape, such as a portion of a ruler, a coin, or the like.

The digital image captured by digital camera 300 is stored in memory area 330, such as memory found in digital camera 300 or memory found in a separate device, such as a stand-alone memory or separate information handling system. The approach provided herein performs various processes utilizing digital image 330. Object analysis process 340 analyzes the digital image of hardware object 310 that is stored in memory area 330 and generates various metadata pertaining to the object. The object's metadata is stored in memory area 350. If a reference object is included in digital image 330, then object analysis process 340 utilizes the known size data from the reference object to improve the object metadata stored in memory area 350.

Identification of tools and compatible parts process 360 analyzes the object metadata that was gathered by process 340 in order to identify compatible tools and parts pertaining to the object. These compatible tools and parts are stored in memory area 370. For example, if the object is a bolt of a particular size, then compatible tools would include wrenches and sockets that are compatible with the size of the head on the bolt. Likewise, compatible parts would include nuts that are compatible with the diameter of the bolt as well as being compatible with the thread angle and spacing on the bolt. Other compatible parts might also include different types of nuts (e.g., standard nuts, lock nuts, etc.) and other compatible objects, such as washers, lock washers, and the like.

User interface 380 is an interface provided to user 390 to view the compatible tools and parts that were identified and stored in memory area 370 along with descriptions of such compatible tools and parts (e.g., part descriptions, size details, etc.). Additionally, user interface 380 also provides user 390 with the ability to order any number of the compatible tools and parts from online merchants. Because digital camera 300 can be a digital camera integrated with the user's smart phone, all of the processes can be performed at the user's smart phone or at online sites with such sites returning analysis data to the user's smart phone. In this manner, the user can take a digital image of a part of interest, such as a bolt, run the processes described herein, and view the results in user interface 380 on the user's smart phone display. The user can then order any needed tools and compatible parts from an online merchant or can shop at a traditional store, such as a hardware store, and easily find the tools and compatible parts needed.

Figure 4:
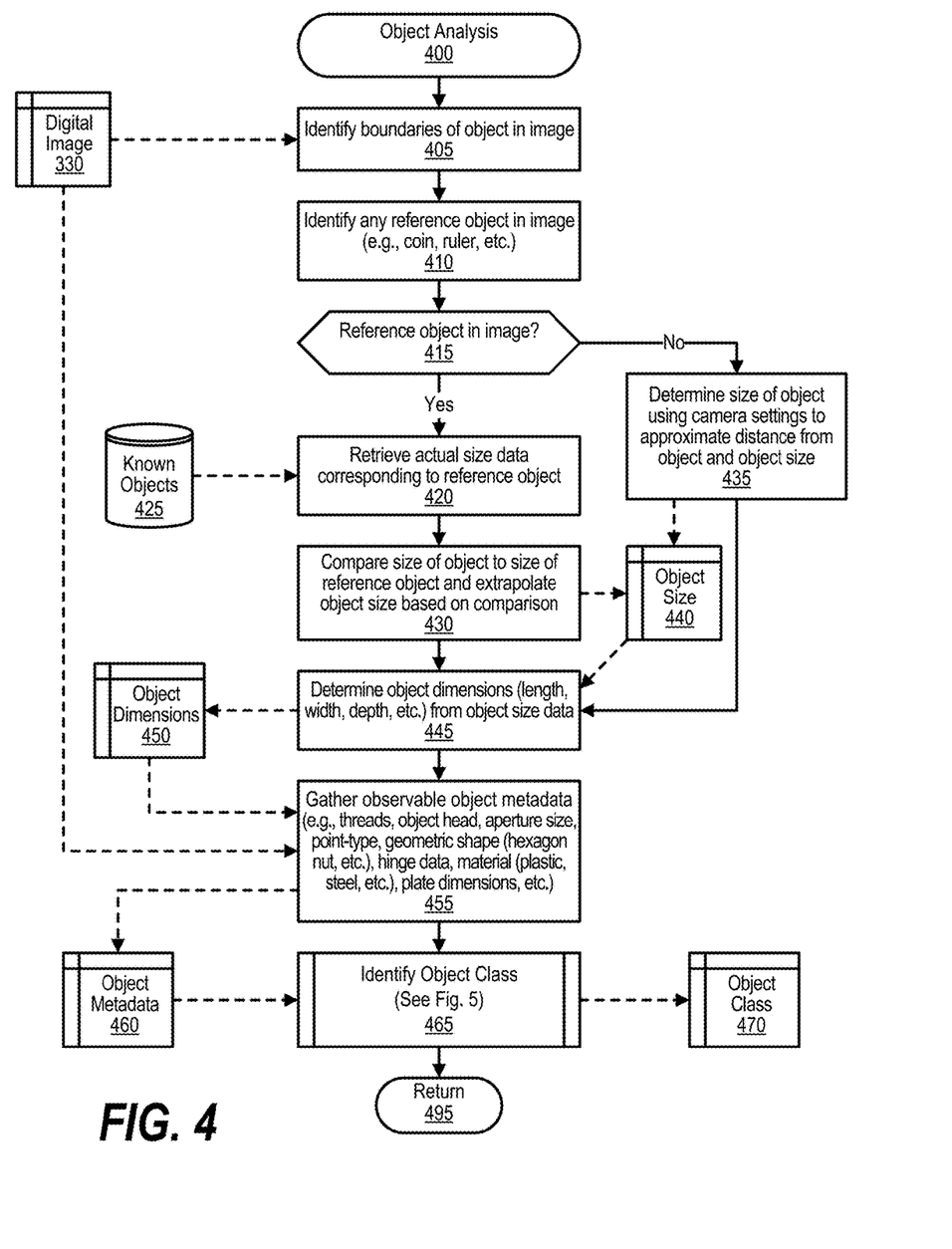
FIG. 4 is a flowchart showing steps taken by a process that performs an analysis of the physical object to determine an object's size and identify metadata pertaining to the physical object.

FIG. 4 is a flowchart showing steps taken by a process that performs an analysis of the physical object to determine an object's size and identify metadata pertaining to the physical object. FIG. 4 processing commences at 400 and shows the steps taken by a process that analyzes the object of interest to the user that was captured by the user's digital camera. At step 405, the process identifies boundaries of the object in the image that is stored in memory area 330, with the object being an item such as a bolt or other hardware item with any number of facets. At step 410, the process identifies whether any reference object is included in the digital image. Examples of reference objects might include a coin, a ruler, or any reference object that has a known size and shape.

The process determines as to whether a reference object was included in the digital image (decision 415). If a reference object was included in the digital image, then decision 415 branches to the 'yes' branch to perform steps 420 through 430. On the other hand, if a reference object was not included in the digital image, then decision 415 branches to the 'no' branch to perform step 435. If a reference object was included in the digital image then steps 420 and 430 are performed. At step 420, the process retrieves actual size data corresponding to the reference object, such as the actual size of a particular coin, such as a penny, etc. The actual size data of known objects is retrieved from data store 425. At step 430, the process compares the size of the object to the retrieved size of the reference object and extrapolates the actual object size based on this comparison. The actual size data of the object is stored in memory area 440 and can also include the size of various facets found on the object, such as the head on a bolt, the distance between threads, and the like. If a reference object was not included in the digital image, then step 435 is performed. At step 435, the process determines the actual size of the object using the digital camera settings to approximate the distance from the lens to the object as well as the actual object size based by the distance from the lens to the object. The actual size data of the object is stored in memory area 440 and can also include the size of various facets found on the object, such as the head on a bolt, the distance between threads, and the like.

At step 445, the process determines the object dimensions (length, width, depth, etc.) from object size data. The object dimensions are stored in memory area 450 and also include dimensions of the various facets (e.g., sides, threads, etc.) found on the object. At step 455, the process gathers observable object metadata, such as threads, object head, aperture size, point-type, geometric shape (hexagon nut, etc.), hinge data, material (plastic, steel, etc.), plate dimensions, and the like. Step 455 retrieves object dimension data from memory area 450 and processes the object that was captured and stored in memory area 330. The resulting object metadata is stored in memory area 460.

Figure 5:
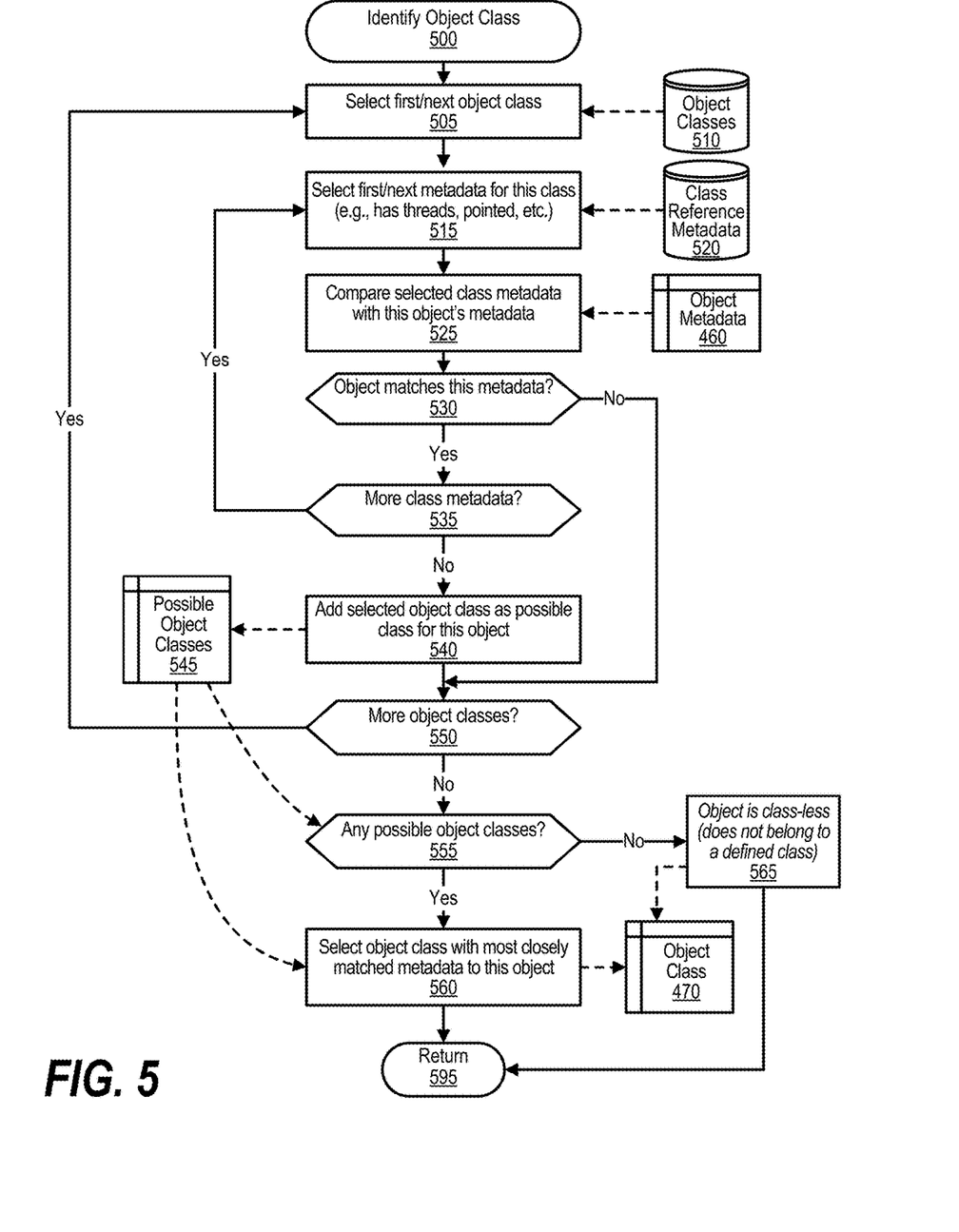
FIG. 5 is a flowchart showing steps taken by a process that identifies a class of objects to which the physical object belongs.

At predefined process 465, the process performs the Identify Object Class routine (see FIG. 5 and corresponding text for processing details). This routine analyzes the object metadata that was stored in memory area 460 and, if an object class is found, stores the object class in memory area 470. In one embodiment, an object class is a characteristic, or trait, common to many similar objects, such as bolts, screws, nuts, and the like. FIG. 4 processing thereafter returns to the calling routine (see FIG. 3) at 495.

FIG. 5 is a flowchart showing steps taken by a process that identifies a class of objects to which the physical object belongs. FIG. 5 processing commences at 500 and shows the steps taken by a process that identifies the object class of an object of interest to the user. The object class, when found, allows the process to focus on particular types of tools and compatible objects. For example, if the object class is found to be a "bolt," then tools known to operate on this class of objects, such as wrenches and sockets, are of focus along with compatible object classes such as nuts and washers that are compatible with the object. At step 505, the process selects the first object class from data store 510. At step 515, the process selects the first set of metadata for the selected object class. The class reference metadata is retrieved from data store 520. For example, the metadata might be that the object class has threads, is pointed, etc. At step 525, the process compares the currently selected object class metadata with the actual object's metadata that is retrieved from memory area 460.

The process determines as to whether the object's metadata matches the selected class reference metadata (decision 530). If the object's metadata matches the selected class reference metadata, then decision 530 branches to the 'yes' branch to process the match. On the other hand, if the object's metadata does not match the selected class reference metadata, then decision 530 branches to the 'no' branch to continue searching other object classes. If the object's metadata matches the selected class reference metadata, then the process determines whether there are more class metadata that need to be processed (decision 535). If more class metadata need to be processed, then decision 535 branches to the 'yes' branch which loops back to select the next set of class reference metadata and compare it to the object's metadata. This looping continues until there is no more class reference metadata to process, indicating that the class is a possible class to which the object belongs, at which point decision 535 branches to the 'no' branch whereupon. at step 540, the process adds the selected object class as a possible class for this object with the object class being stored in memory area 545.

The process determines as to whether there are more object classes to process (decision 550). If there are more object classes to process, then decision 550 branches to the 'yes' branch which loops back to step 505 to select and process the next object class as described above. This looping continues until there are no more object classes to process, at which point decision 550 branches to the 'no' branch exiting the loop. The process determines as to whether there are any possible object classes to which the object belongs (decision 555). If there are any possible object classes to which the object belongs, then decision 555 branches to the 'yes' branch whereupon, at step 560, the process selects the object class with metadata that most closely matches the metadata of this object and the object class is stored in memory area 470. On the other hand, if memory area 545 is empty, then decision 555 branches to the 'no' branch whereupon, At step 565, the process notes that the object is class-less and does not belong to a defined object class. FIG. 5 processing thereafter returns to the calling routine (see FIG. 4) at 595.

Figure 6:
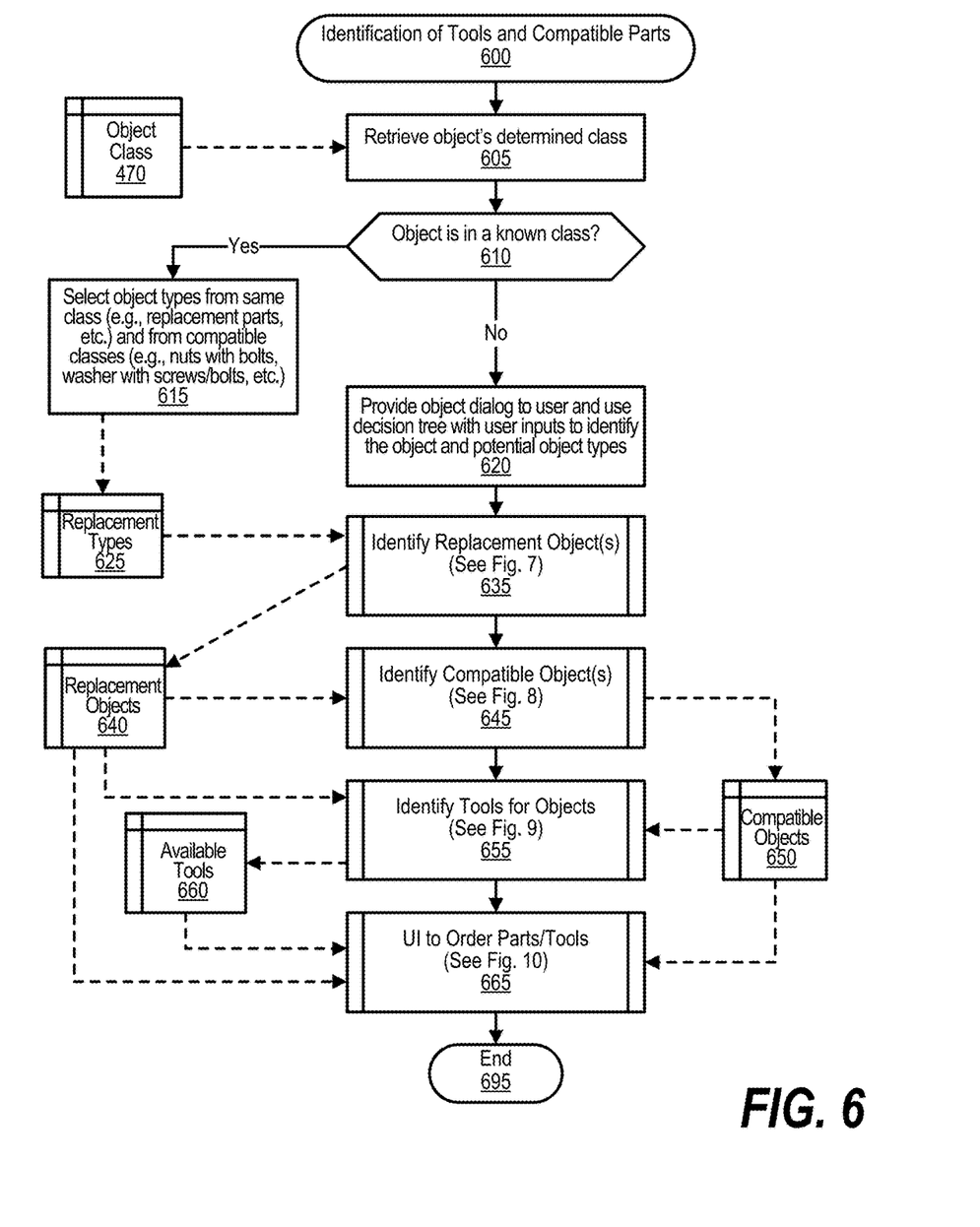
FIG. 6 is a flowchart showing steps taken to identify tools and compatible parts that correspond to the physical object.

FIG. 6 is a flowchart showing steps taken to identify tools and compatible parts that correspond to the physical object. FIG. 6 processing commences at 600 and shows the steps taken by a process that identifies of tools and compatible parts for the object that is of interest to the user. At step 605, the process retrieves object's determined class from memory area 470. The process next determines whether the object is a member of a known object class, such as bolts, fasteners, etc. (decision 610). If the object is a member of a known object class, then decision 610 branches to the 'yes' branch to perform step 615. On the other hand, if the object class-less (not a member of a known object class), then decision 610 branches to the 'no' branch to perform step 620. At step 615, the process selects the object types from same class as the object. For example, replacement parts for a broken or worn out bolt, etc. as well as from compatible classes, such as nuts with bolts, washer with screws and/or bolts, and the like. The replacement types are stored in memory area 625. At step 620, since the object is not a member of a known class, the process provides an object dialog to the user and uses a decision tree with user inputs to identify the object and potential object types.

Figure 7:
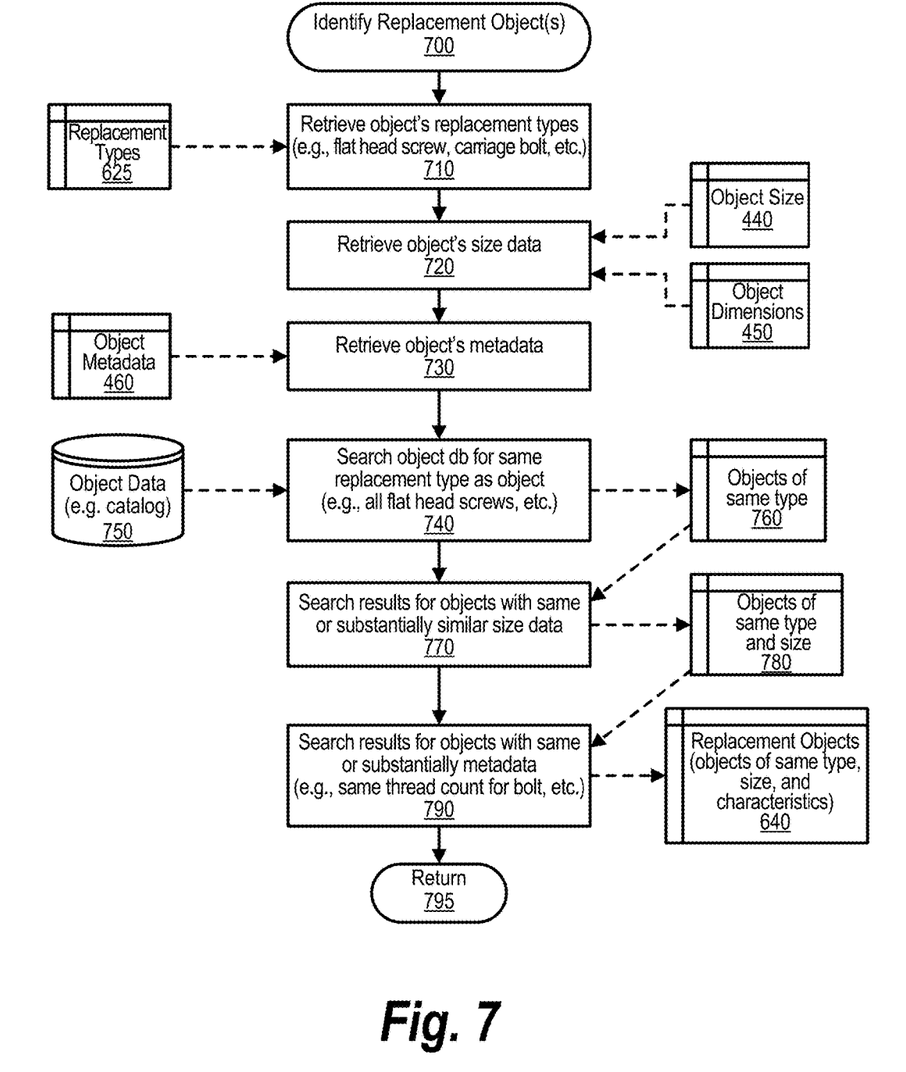
FIG. 7 is a flowchart showing steps that identifies replacement objects corresponding to the physical object that is of interest to the user.

At predefined process 635, the process performs the Identify Replacement Object(s) routine (see FIG. 7 and corresponding text for processing details). This predefined process uses replacement types stored in memory area 625 to identify specific replacement objects that are stored in memory area 640.

Figure 8:
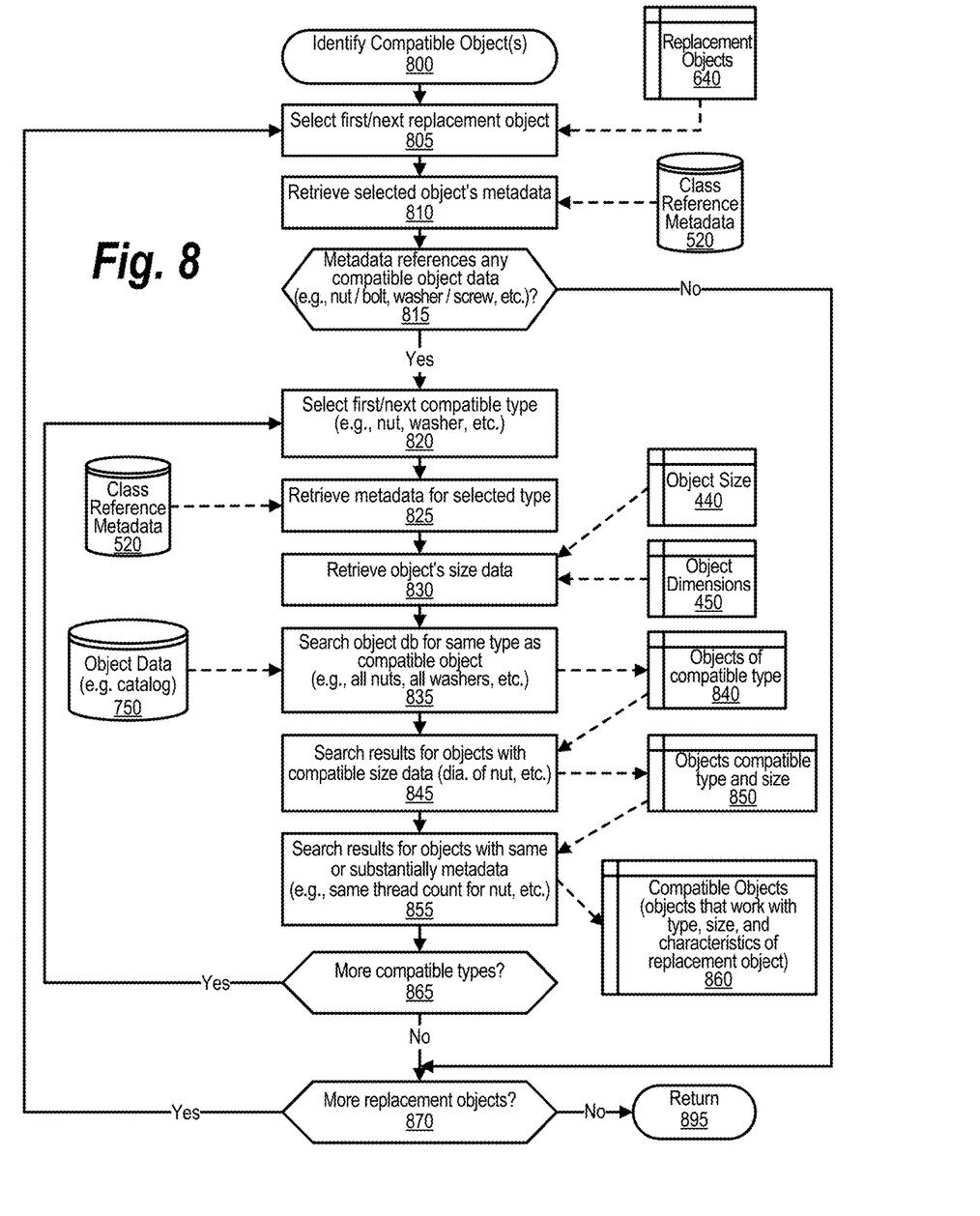
FIG. 8 is a flowchart showing steps taken that identifies compatible objects corresponding to the physical object that is of interest to the user.

At predefined process 645, the process performs the Identify Compatible Object(s) routine (see FIG. 8 and corresponding text for processing details). This predefined process takes the replacement objects stored in memory area 640 as an input to identify such compatible objects that are then stored in memory area 650.

Figure 9:
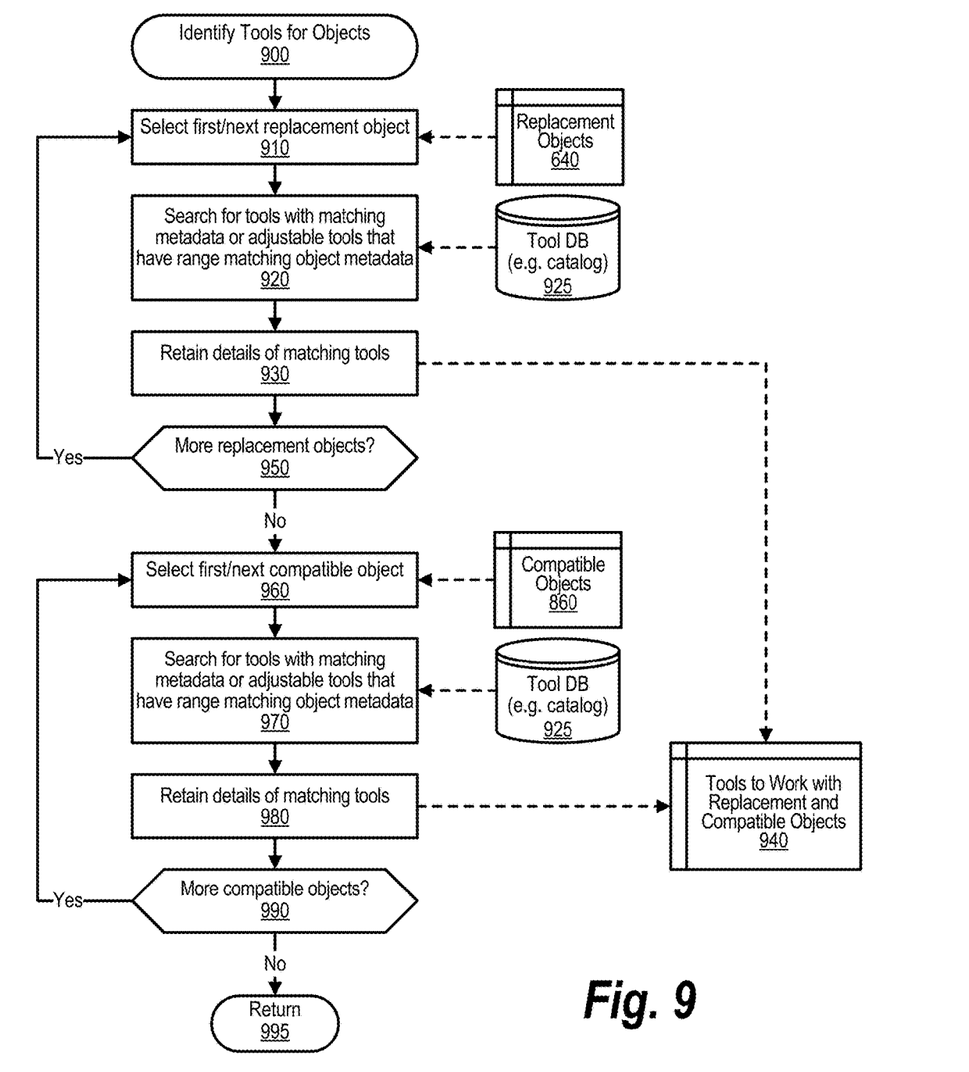
FIG. 9 is a flowchart showing steps that identifies tools corresponding to the physical object that is of interest to the user.

At predefined process 655, the process performs the Identify Tools for Objects routine (see FIG. 9 and corresponding text for processing details). This predefined process takes both replacement objects from memory area 640 and compatible objects from memory area 650 to identify tools and stores identifiers of the tools that can be used with such objects and compatible objects in memory area 660.

Figure 10:
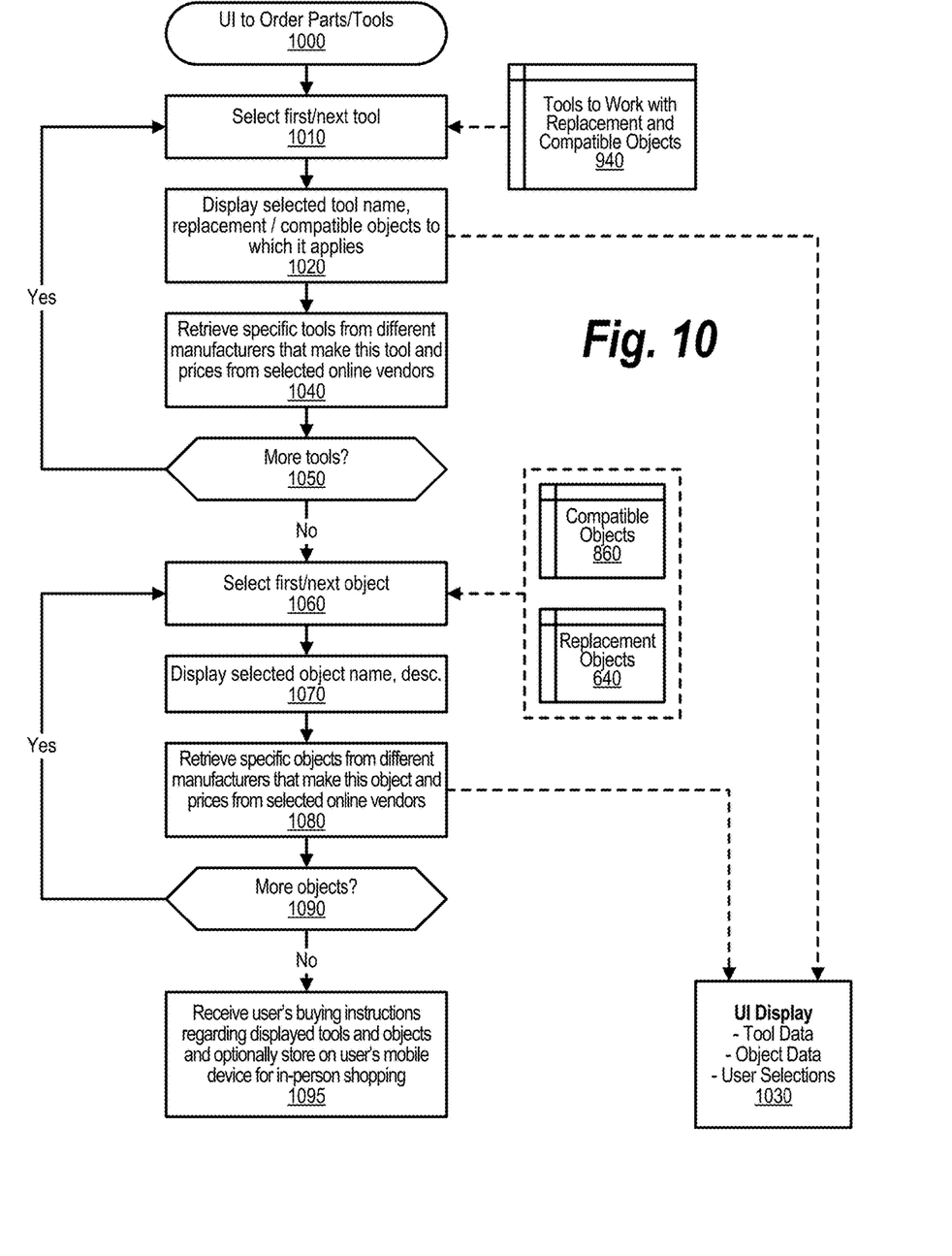
FIG. 10 is a flowchart showing steps taken by the user interface to order parts and tools corresponding to the physical object.

At predefined process 665, the process displays a user interface (UI) to Order Parts/Tools routine (see FIG. 10 and corresponding text for processing details). The user interface displays replacement objects from memory area 640, compatible objects from memory area 650, and available tools from memory area 660 for display to the user and further provides the ability for the user to purchase such items from online merchants FIG. 6 processing thereafter ends at 695.

FIG. 7 is a flowchart showing steps that identifies replacement objects corresponding to the physical object that is of interest to the user. FIG. 7 processing commences at 700 and shows the steps taken by a process that identifies replacement objects. At step 710, the process retrieves object's replacement types, such as flat head screw, carriage bolt, etc., from memory area 625. At step 720, the process retrieves the object's size and dimension data from memory areas 440 and 450, respectively. At step 730, the process retrieves the object's metadata from memory area 460.

At step 740, the process searches an object database for the same replacement type as the object that is of interest to the user, such as all flat head screws, etc. The search results are stored in memory area 760. At step 770, the process searches the results stored in memory area 760 for objects that have the same or substantially similar size data. These search results are stored in memory area 780. At step 790, the process searches the results stored in memory area 780 for those objects that have the same or substantially similar metadata as the object of interest to the user, such as the same thread count for a bolt or screw, etc. These final replacement object results are stored in memory area 640 for eventual display to the user using a user interface. FIG. 7 processing thereafter returns to the calling routine (see FIG. 6) at 795.

FIG. 8 is a flowchart showing steps taken that identifies compatible objects corresponding to the physical object that is of interest to the user. FIG. 8 processing commences at 800 and shows the steps taken by a process that identifies compatible objects to the object that is of interest to the user. At step 805, the process selects the first replacement object from memory area 640. At step 810, the process retrieves the selected replacement object's metadata from data store 520.

The process determines as to whether the retrieved metadata references any compatible object data, such as a nut for a bolt, a washer for a screw, etc. (decision 815). If the retrieved metadata references any compatible object data, then decision 815 branches to the 'yes' branch to perform steps 820 through 865. On the other hand, if the retrieved metadata does not reference any compatible object data, then decision 815 branches to the 'no' branch bypassing steps 820 through 865. If the retrieved metadata references any compatible object data, then steps 820 through 865 are performed. At step 820, the process selects the first compatible type (e.g., nut, washer, etc.). At step 825, the process retrieves metadata for the selected type from data store 520. At step 830, the process retrieves the object's size and dimension data from memory areas 440 and 450, respectively. At step 835, the process searches object database 750 for objects with the same type as the compatible object (e.g., all nuts, all washers, etc.). The search results are stored in memory area 840. At step 845, the process searches the results stored in memory area 840 for objects with compatible size data (e.g., diameter of nut, etc.). The search results are stored in memory area 850. At step 855, the process searches the results stored in memory area 850 for objects with the same or substantially similar metadata (e.g., objects with the same thread count for a nut or bolt, etc.). The search results are stored in memory area 860.

The process determines as to whether there are more compatible types to process (decision 865). If there are more compatible types to process, then decision 865 branches to the 'yes' branch which loops back to step 820 to select and process the next compatible type as described above. This looping continues until there are no more compatible types to process, at which point decision 865 branches to the 'no' branch exiting the loop. The process determines as to whether there are more replacement objects to select and process (decision 870). If there are more replacement objects to select and process, then decision 870 branches to the 'yes' branch which loops back to step 805 to select and process the next replacement object as described above. This looping continues until there are no more replacement objects to select and process, at which point decision 870 branches to the 'no' branch exiting the loop. FIG. 8 processing thereafter returns to the calling routine (see FIG. 6) at 895.

FIG. 9 is a flowchart showing steps that identifies tools corresponding to the physical object that is of interest to the user. FIG. 9 processing commences at 900 and shows the steps taken by a process that identifies tools that can be used on objects of interest to the user. At step 910, the process selects the first replacement object from memory area 640. At step 920, the process searches for tools with matching metadata or adjustable tools, such as an adjustable wrench, that have ranges matching the object metadata. The tools and their corresponding metadata are retrieved from data store 925. At step 930, the process retains the details of tools that match the replacement objects. The matching tools and such tools descriptions and metadata are stored in memory area 940. The process determines as to whether there are more replacement objects to process (decision 950). If there are more replacement objects to process, then decision 950 branches to the 'yes' branch which loops back to step 910 to select and process the next replacement object as described above. This looping continues until there are no more replacement objects to process, at which point decision 950 branches to the 'no' branch exiting the loop.

At step 960, the process selects the first compatible object from memory area 860. At step 970, the process searches for tools with matching metadata or adjustable tools, such as an adjustable wrench, that have ranges matching the object metadata. The tools and their corresponding metadata are retrieved from data store 925. At step 980, the process retains the details of tools that match the compatible objects. The matching tools and such tools descriptions and metadata are stored in memory area 940. The process determines as to whether there are more compatible objects to process (decision 990). If there are more compatible objects to process, then decision 950 branches to the 'yes' branch which loops back to step 960 to select and process the next compatible object as described above. This looping continues until there are no more compatible objects to process, at which point decision 990 branches to the 'no' branch exiting the loop. FIG. 9 processing thereafter returns to the calling routine (see FIG. 6) at 995.

FIG. 10 is a flowchart showing steps taken by the user interface to order parts and tools corresponding to the physical object. FIG. 10 processing commences at 1000 and shows the steps taken by a process that displays and manages a user interface (UI) that displays parts and tools to the user and also allows the user to order such tools and parts.

At step 1010, the process selects the first tool from memory area 940. At step 1020, the process displays the selected tool name and the replacement or compatible objects on which the tool can operate, such as a wrench that can operate on a bolt or nut, etc. The data is displayed on UI Display 1030. At step 1040, the process retrieves specific tools from different manufacturers that make the selected tool as well as retrieving prices for the specific tools from selected online vendors. The data is also displayed on UI Display 1030. The process determines as to whether there are more tools to select and display on the UI (decision 1050). If there are more tools to select and display on the UI, then decision 1050 branches to the 'yes' branch which loops back to step 1010 to select and process the next tool as described above. This looping continues until there are no more tools to select and display on the UI, at which point decision 1050 branches to the 'no' branch exiting the loop.

At step 1060, the process selects the first object with the object being either a replacement object retrieved from memory area 640 or a compatible object retrieved from memory area 860. At step 1070, the process displays the selected object name, description, and any other metadata that might be useful to the user. The data is displayed on UI Display 1030. At step 1080, the process retrieves specific object data from different manufacturers that make the selected object and also retrieves prices from selected online vendors. The retieved data is displayed on UI Display 1030. The process determines as to whether there are more objects to select and display on the UI (decision 1050). If there are more objects to select and display on the UI, then decision 1050 branches to the 'yes' branch which loops back to step 1060 to select and process the next object as described above. This looping continues until there are no more objects to select and display on the UI, at which point decision 1050 branches to the 'no' branch exiting the loop. At step 1095, the process receives the user's buying instructions at the UI regarding the displayed tools and objects and optionally stores the displayed data and optionally such buying instructions on the user's mobile device for in-person shopping.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

capturing a digital image of an object that has a plurality of facets;
determining, from the captured digital image, an actual size of one or more of the object's facets;
identifying one or more compatible objects based on the actual size of the object's facets;
generating a search criteria based on a selected one of the one or more compatible objects;
searching a data store that includes identifiers of a plurality of component products, wherein the searching utilizes the search criteria and results in a selected set of one or more of the plurality of component products;
displaying the selected set of component products to a user;
receiving a purchase selection of one of the displayed component products from the user; and
ordering the displayed component product corresponding to the received purchase selection from a selected online merchant.

2. The method of claim 1, wherein at least one of the compatible objects is a compatible replacement object of the object, and wherein the method further comprising:
identifying one or more boundaries of the object from the digital image; and
distinguishing a reference object from the object, wherein both the reference object and the object are included in the digital image, and wherein the reference object has a known size.

3. The method of claim 2 further comprising:
identifying a reference image size of the reference object in the digital image; and
extrapolating an image scale based on the identified reference image size and the known size of the reference object.

4. The method of claim 3 further comprising:
identifying an object image size of the object in the digital image; and
determining the actual size of the object based on the extrapolated image scale and the object image size.

5. The method of claim 4 further comprising:
identifying a set of object metadata pertaining to the object;
comparing the identified set of object metadata to a plurality of sets of object class metadata;
identifying an object class of the object based on the comparing;
identifying one or more compatible object types based on the identified object class; and
identifying the one or more compatible objects from a set of product objects belonging to the compatible object types and based on the actual size of the object.

6. The method of claim 1 further comprising:
receiving a price corresponding to the set of component products from a plurality of online merchants; and
displaying the price corresponding to each of the selected set of component products along with the online merchant associated with the displayed price, wherein the purchase selection includes the selected online merchant.

7. An information handling system comprising:
one or more processors;
a memory coupled to at least one of the processors; and
a set of computer program instructions stored in the memory and executed by at least one of the processors in order to perform actions comprising:
capturing a digital image of an object that has a plurality of facets;
determining, from the captured digital image, an actual size of one or more of the object's facets;
identifying one or more compatible objects based on the actual size of the object's facets;
generating a search criteria based on a selected one of the one or more compatible objects;
searching a data store that includes identifiers of a plurality of component products, wherein the searching utilizes the search criteria and results in a selected set of one or more of the plurality of component products;
displaying the selected set of component products to a user;
receiving a purchase selection of one of the displayed component products from the user; and
ordering the displayed component product corresponding to the received purchase selection from a selected online merchant.

8. The information handling system of claim 7, wherein at least one of the compatible objects is a compatible replacement object of the object, and wherein the actions further comprise:
identifying one or more boundaries of the object from the digital image; and
distinguishing a reference object from the object, wherein both the reference object and the object are included in the digital image, and wherein the reference object has a known size.

9. The information handling system of claim 8 wherein the actions further comprise:
identifying a reference image size of the reference object in the digital image; and
extrapolating an image scale based on the identified reference image size and the known size of the reference object.

10. The information handling system of claim 9 wherein the actions further comprise:
identifying an object image size of the object in the digital image; and
determining the actual size of the object based on the extrapolated image scale and the object image size.

11. The information handling system of claim 10 wherein the actions further comprise:
identifying a set of object metadata pertaining to the object;
comparing the identified set of object metadata to a plurality of sets of object class metadata;
identifying an object class of the object based on the comparing;
identifying one or more compatible object types based on the identified object class; and
identifying the one or more compatible objects from a set of product objects belonging to the compatible object types and based on the actual size of the object.

12. The information handling system of claim 7 wherein the actions further comprise:
receiving a price corresponding to the set of component products from a plurality of online merchants; and
displaying the price corresponding to each of the selected set of component products along with the online merchant associated with the displayed price, wherein the purchase selection includes the selected online merchant.

13. A computer program product stored in a non-transitory computer readable storage medium, comprising computer program code that, when executed by an information handling system, performs actions comprising:

capturing a digital image of an object that has a plurality of facets;

determining, from the captured digital image, an actual size of one or more of the object's facets;

identifying one or more compatible objects based on the actual size of the object's facets;

generating a search criteria based on a selected one of the one or more compatible objects;

searching a data store that includes identifiers of a plurality of component products, wherein the searching utilizes the search criteria and results in a selected set of one or more of the plurality of component products;

displaying the selected set of component products to a user;

receiving a purchase selection of one of the displayed component products from the user; and ordering the displayed component product corresponding to the received purchase selection from a selected online merchant.

14. The computer program product of claim 13, wherein at least one of the compatible objects is a compatible replacement object of the object, and wherein the actions further comprise:

identifying one or more boundaries of the object from the digital image; and distinguishing a reference object from the object, wherein both the reference object and the object are included in the digital image, and wherein the reference object has a known size.

15. The computer program product of claim 14 wherein the actions further comprise:

identifying a reference image size of the reference object in the digital image; and extrapolating an image scale based on the identified reference image size and the known size of the reference object.

16. The computer program product of claim 15 wherein the actions further comprise:

identifying an object image size of the object in the digital image; and determining the actual size of the object based on the extrapolated image scale and the object image size.

17. The computer program product of claim 16 wherein the actions further comprise:

identifying a set of object metadata pertaining to the object;

comparing the identified set of object metadata to a plurality of sets of object class metadata;

identifying an object class of the object based on the comparing;

identifying one or more compatible object types based on the identified object class; and identifying the one or more compatible objects from a set of product objects belonging to the compatible object types and based on the actual size of the object.

* * * * *